United States Patent
Pinko

(10) Patent No.: US 10,230,815 B2
(45) Date of Patent: Mar. 12, 2019

(54) SERVICE-ABSTRACTING QUERY INTERFACE

(71) Applicant: Facebook, Inc., Menlo Park, CA (US)

(72) Inventor: Ronen Pinko, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 308 days.

(21) Appl. No.: 14/103,698

(22) Filed: Dec. 11, 2013

(65) Prior Publication Data

US 2015/0161199 A1    Jun. 11, 2015

(51) Int. Cl.
*G06F 17/30* (2006.01)
*H04L 29/08* (2006.01)
*G06F 9/448* (2018.01)

(52) U.S. Cl.
CPC .......... *H04L 67/306* (2013.01); *G06F 9/4488* (2018.02); *G06F 17/30864* (2013.01); *H04L 67/327* (2013.01)

(58) Field of Classification Search
CPC ............... G06F 17/30286; G06F 17/30781
USPC ........................................................ 707/796
See application file for complete search history.

(56) References Cited

U.S. PATENT DOCUMENTS

| | | | |
|---|---|---|---|
| 2003/0120824 A1* | 6/2003 | Shattuck | G06F 9/4433 719/313 |
| 2003/0217128 A1* | 11/2003 | Yanosy | H04L 29/06 709/223 |
| 2004/0054690 A1* | 3/2004 | Hillerbrand | G06Q 10/06 |
| 2006/0218116 A1* | 9/2006 | O'Hearn | G06Q 10/06 |
| 2012/0028713 A1* | 2/2012 | Driemeyer | A63F 13/12 463/42 |
| 2013/0086099 A1* | 4/2013 | Rolia | G06F 17/3089 707/767 |

* cited by examiner

*Primary Examiner* — Tuankhanh D Phan
(74) *Attorney, Agent, or Firm* — Baker Botts L.L.P.

(57) ABSTRACT

In one embodiment, at run-time, a query engine may receive a request to populate properties of an application class with data. The query engine may use reflection to inspect the application class and identify at least one platform interface providing properties of the application class. The query engine may then generate a query for a specific service associated with the platform interface. The query engine may then retrieve data from the service. After receiving a response from the service, the query engine may use reflection to bind the retrieved data to properties of the application class and return the application class in response to the request. The query engine may have previously analyzed a schema identifying data types provided by the service and generated, based on the schema, platform classes and platform interfaces.

17 Claims, 4 Drawing Sheets

US 10,230,815 B2

SERVICE-ABSTRACTING QUERY INTERFACE

TECHNICAL FIELD

This disclosure generally relates to querying a social graph.

BACKGROUND

A social-networking system, which may include a social-networking website, may enable its users (such as persons or organizations) to interact with it and with each other by way of interactions conducted using data and/or functionality provided by the social-networking system. The social-networking system may create and store in the social-networking system a user profile associated with the user. The user profile may include demographic information, communication-channel information, and information regarding personal interests of the user. The social-networking system may also create and store a record of relationships of the user with other users of the social-networking system. The social-networking system may also provide functionality (e.g., wall posts, photo-sharing, event organization, messaging, games, or advertisements) to facilitate social interaction between or among users.

In particular embodiments, such different types of data may be stored in a plurality of data stores, wherein access to each data store is provided by way of a service providing a query interface (e.g., to HTTP-based requests complying with a schema specification published by the service). In particular embodiments, the architecture of the social-networking system may include a heterogeneous set of services, each having a different schema.

SUMMARY OF PARTICULAR EMBODIMENTS

In one embodiment, at run-time, a query engine may receive a request to populate properties of an application class with data. The query engine may use reflection in order to inspect the application class (e.g., by performing type introspection) and identify a platform interface, wherein the platform interface is associated with a platform class in the type hierarchy.

The query engine may then generate a query for a specific service associated with the platform interface. The query engine may then retrieve data from the service. After receiving a response from the service, the query engine may use reflection to bind the retrieved data to properties of the application class (e.g., using an adapter) and return the application class in response to the request. The query engine may have previously analyzed a schema identifying data types provided by the service and generated, based on the schema, platform classes and platform interfaces.

In particular embodiments, such a system may include multiple services, each having its own particular schema, and a single type hierarchy may include platform classes generated based upon schemas for all of the services.

DESCRIPTION OF EXAMPLE EMBODIMENTS

Figure 1:
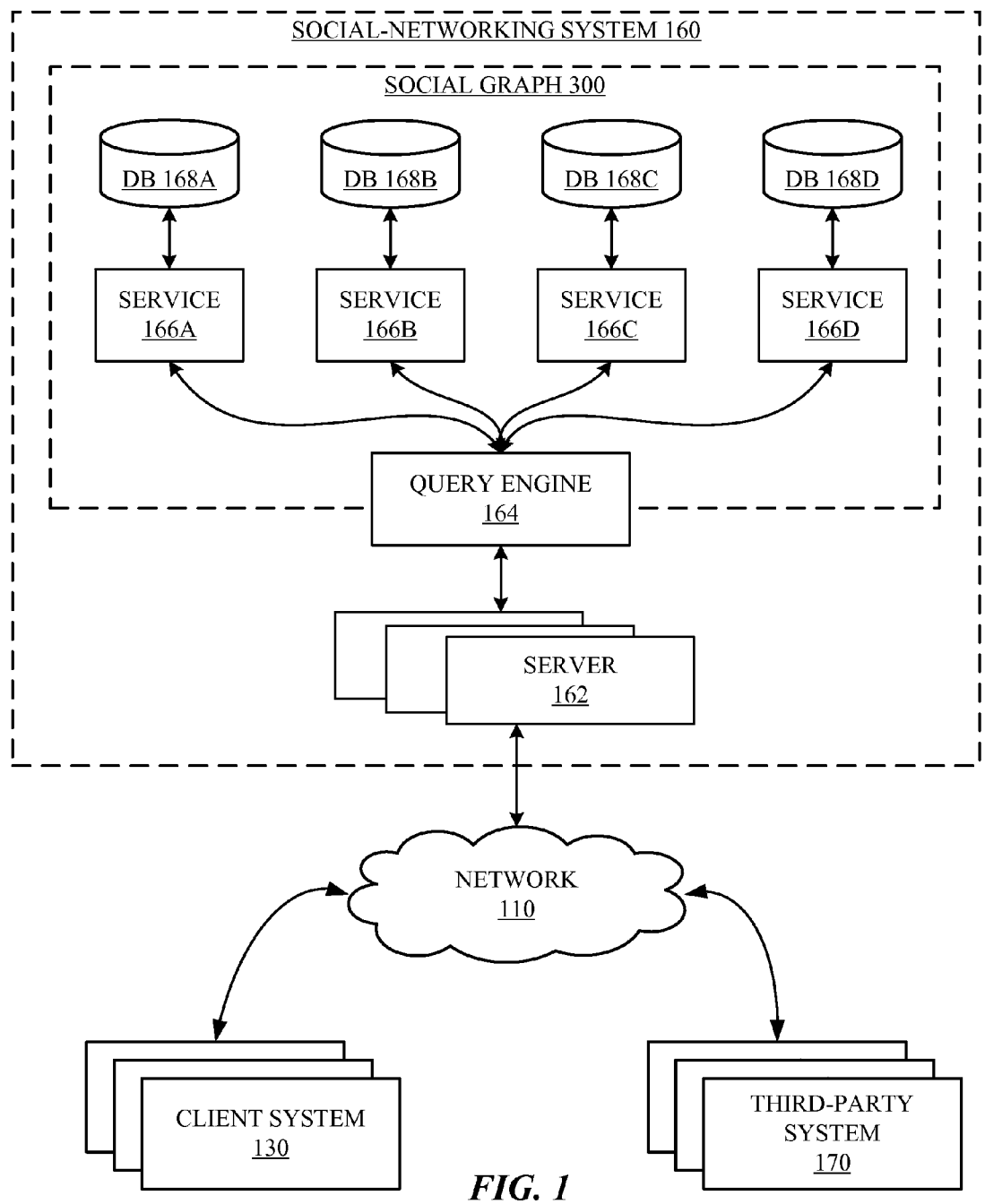
FIG. 1 illustrates an example network environment associated with a social-networking system.

Information stored by a social-networking system may be accessible by means of a heterogeneous set of services that respond to queries for social graph information and other social-networking information. The social-networking system may include several such query services, each of which provide access to a different type of information associated with the social-networking system, such as, for example: user profile information, relationship information, transaction information, and content information. Although embodiments are described herein in the example context of a social-networking system, the invention may be used in the context of other systems, such as any system storing complex data across multiple services.

In particular embodiments, different applications and functions supported by the social-networking system may send requests to retrieve information from these various services, including, for example, internal "system" functions (such as calculation of graph statistics and coefficients), applications and functions provided by the social-networking system (such as connecting with other users, messaging other users, generating a news feed, supporting targeted advertising and promotion of sponsored stories, and enabling content-related functions, such as posting, commenting, liking, flagging, and/or rating), and third-party applications and functions (e.g., built for execution on a platform provided by the social-networking system, integrating functionality supported by the social-networking system, supplying information regarding the activities of social-networking users on a third-party website, and/or retrieving social-networking information for integration into a third-party website).

As a typical social-networking system evolves, new types of information may need to be stored—for technical and/or business-related reasons, it may be necessary to introduce heterogeneity or to increase the degree of heterogeneity within the set of services existing within the architecture of the social-networking system by adding a new query service with a different schema, which may also have a different syntax. In order to allow the social-networking system to evolve organically and scalably by adding new and different query services while reducing the burden upon developers to adapt and/or re-write applications and/or functionality to account for changes in the set of services, particular embodiments provide a run-time query engine that uses reflection to handle (1) translation of a service-agnostic request for data into a service-specific request and (2) translation of a service-specific response provided according to the service's specified schema into a service-agnostic response that can then be returned in response to the original service-agnostic request. The query engine provides a front end interface to the diverse query services so as to make any differences between the query services transparent to an end user submitting a query.

Such translation enables a layer of abstraction that hides details of and differences between the various services, which enables a developer to write service-agnostic code that can retrieve and/or update such information. For example, given an application class that implements a platform interface corresponding to a platform class, wherein the platform interface and platform class were previously generated based on a schema for a specific service, an application may call upon the query engine to instantiate the class, initialize the class instance, retrieve data for one or more properties of the class, or update one or more properties of the class. By using reflection, the query engine may inspect the application class, determine the platform interface implemented by the application class, and thereby identify the specific service from whose schema the platform interface was generated. The query engine may then generate a service-specific query to retrieve the required information, and once a response from the service is received, use an adapter to bind data from the service-specific response to an instance of the application class.

This technique may be far more flexible as the system grows and evolves (and services are added, removed, and modified), rather than constantly writing service-specific code (with the ensuing burden of having to learn new service schema as new services are introduced to the system). Particular embodiments may be implemented using any appropriate language that provides the capabilities of reflection. By using reflection, particular embodiments are able to provide class discovery, correctness, type safety, and data binding.

FIG. 1 illustrates an example network environment 100 associated with a social-networking system. Network environment 100 may include one or more client systems 130, a social-networking system 160, and one or more third-party systems 170 connected to each other by a network 110.

In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162.

In particular embodiments, social-networking system 160 may include a query engine 164 to perform request/response translation, using reflection, as described herein. Query engine 164 translates the service-agnostic requests received from servers 162 to service-specific requests, which are then sent to a particular service 166, such as, by way of example and not limitation: GRAPHQL, FACEBOOK QUERY LANGUAGE (FQL), and APACHE HIVE. Upon receiving a response from the particular service 166, query engine 164 then translates information from the service-specific response into a suitable service-agnostic format (e.g., a class). Query engine 164 may be able to handle communication with the services in any format handled by the services.

In particular embodiments, services 166 handle requests to retrieve data from and store data into data stores 168, as described above. In one example embodiment, service 166A may provide access to user profile information stored in data store 168A, service 166B may provide access to relationship information stored in data store 168B, service 166C may provide access to transaction information stored in data store 168C, and service 166D may provide access to content information stored in data store 168D. In particular embodiments, a data store 168 and its corresponding service 166 may be part of the same system as query engine 164 or part of a third-party system.

In particular embodiments, the information stored in data stores 168 may be organized according to specific data structures. In particular embodiments, each data store 168 may be a relational, columnar, correlation, or other suitable database, one or more files, or any other suitable format for data storage. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data stores 168 by way of services 166.

In particular embodiments, social-networking system 160 may store one or more social graphs 300 in one or more data stores 168. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In example embodiments, client system 130 may be an end-user's device that accesses social-networking functionality by sending requests directly to servers 162; in other example embodiments, client system 130 may be an application server, residing in the same data center as servers 162, that provides a social-networking application that executes on top of the social-networking platform.

Network 110 may comprise any network or combination of networks. For example, as between client system 130 and social-networking system 160, network 110 may comprise the Internet (e.g., where the client system is the end-user's device), or network 110 may comprise a LAN (e.g., where the client system is the application server).

Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable an end user at client system 130 to access network 110. A client system 130 may enable its user to communicate with other users at other client systems 130.

In particular embodiments, client system 130 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser to a particular server (such as server 162, or a server associated with a third-party system 170), and the web browser may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, social-networking system 160 may store in data stores 168 user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles.

A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external).

A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects.

A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings.

Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Any data stored in conjunction with the content, data, and/or functionality described herein may also be stored in data stores 168 and accessible by way of services 166.

Figure 2:
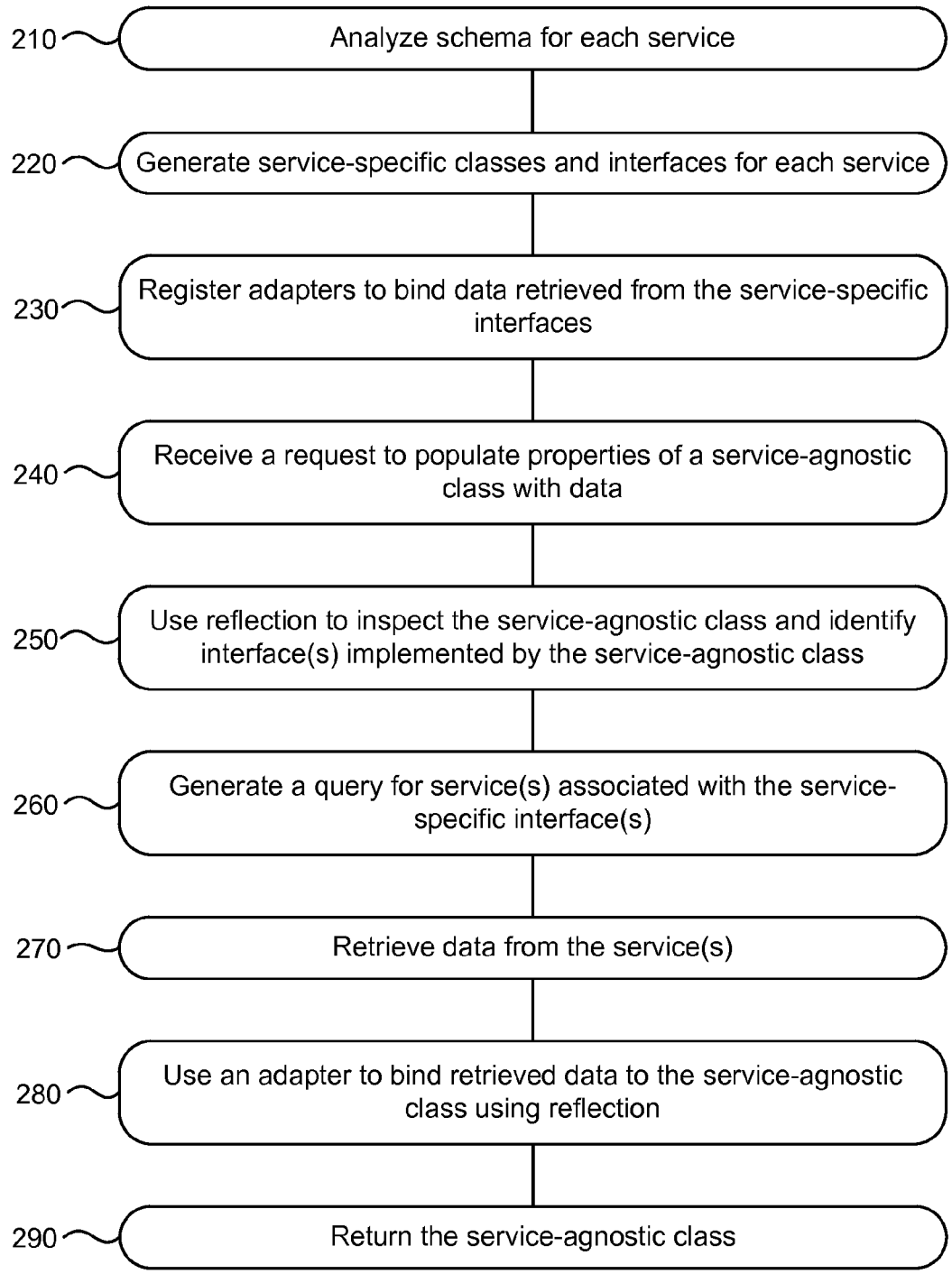
FIG. 2 is a flowchart of steps in an example method for handling queries to language-specific services by using reflection.

FIG. 2 illustrates an example method for handling queries to language-specific services by using reflection. Steps 210-230 describe tasks which may be performed, either during a development phase prior to run-time, or may be performed asynchronously during run-time. Steps 240-290 describe tasks performed during run-time, which may be performed, by way of example and not limitation, query engine 164 as shown in FIG. 1 and described above.

In step 210, particular embodiments analyze schema for each of one or more services. As each new query service is added to the social-networking system (or updated), a code generator (which may be a component of query engine 164) may analyze a schema specification for the service in order to identify data types. Such a schema specification may be provided in an XML-based format (e.g., XSD, GRAPHQL schema, SQL or APACHE HIVE table schema, FbObject schema) that describes particular data structures. For example, excerpts of example schema specifications for the four different services 166A-166D are listed below:

Schema Excerpt for Example Service 166A: User Profile Information

```
<?xml version= "1.0" encoding= "ISO-8859-1" ?>
<xs:schema xmlns:xs="http:/www.w3.org/2001/XMLSchema">
<xs: element name= "userProfile"
   <xs:attribute name= "userID" type= "xs:string use"= "required"/>
   <xs: element name= "memberSince" type= "xs:date"/>
   <xs: element name= "name" type= "xs:string"/>
   <xs:element name= "emailAddress" type= "xs:string"/>
   <xs: element name= "cellPhoneNumber" type= "xs:string"/>
   <xs: element name= "age" type= "xs:positiveInteger"/>
   <xs: element name= "gender type"= "xs:string"/>
   <xs: element name="address">
      <xs:complexType>
         <xs:sequence>
            <xs: element name= "addressType" type= "xs: positiveInteger"/>
            <xs:element name= "addressLine1" type= "xs:string"/>
            <xs:element name= "addressLine2" type= "xs:string"/>
            <xs: element name= "city" type= "xs: string" />
            <xs: element name= "state" type="xs:string"/>
            <xs:element name= "zipCode" type= "xs:string"/>
         </xs:sequence>
      </xs:complexType>
   </xs: element>
</xs: element>
</xs:schema>
```

Schema Excerpt for Example Service 166B: Relationship Information

```
<?xml version= "1.0" encoding= "ISO-8859-1" ? >
<xs:schema xmlns:xs= "http:/www.w3.org/2001/XMLSchema">
<xs: element name= "relationships">
   <xs:attribute name= userID" type= "xs:string" use= "required" />
   <xs:group name= "friends">
      <xs:sequence>
         <xs:element name= "userID" type= "xs:string"/>
         <xs:element name= "connectedSince" type= "xs:date"/>
```

```
            <xs:element name= "rshType" type= "xs:positiveInteger"/>
            <xs:element name= "following" type= "xs:boolean" />
            <xs:element name= "communicationFrequency" type= "xs:decimal"/>
            <xs:element name= "affinityCoefficient" type= "xs:decimal" />
            <xs:element name= "commonGroup" type= "xs:positiveInteger" minOccurs=0 maxOccurs= "unbounded"/>
        </xs:sequence>
    </xs:group>
  </xs:element>
</xs:schema>
```

Schema Excerpt for Example Service 166C: Check-in Information

```
<xml version= "1.0" encoding= "ISO-8859-1" ? >
<xs:schema xmlns:xs= "http://www.w3.org/2001/XMLSchema">
<xs:element name= "checkInAction">
    <xs:attribute name= "userID" type= "xs:string" use= "required"/>
    <xs:element name= "checkInDate" type= "xs:date"/>
    <xs:element name= "checkInTime" type= "xs:time"/>
    <xs:element name= "message" type= "xs:string"/>
    <xs:element name= "eventID" type= "xs:string"/>
    <xs:element name= "photo" type= "xs:string"/>
    <xs:element name= "numLikes" type= "xs:positiveInteger"/>
    <xs:element name= "location">
        <xs:complexType>
          <xs:sequence>
            <xs:attribute name= "conceptID" type= "xs:string"/>
            <xs:element name= "name" type= "xs:string">
            <xs:element name= "addressLine1" type= "xs:string"/>
            <xs:element name= "addressLine2" type= "xs:string"/>
            <xs:element name= "city" type= "xs:string"/>
            <xs:element name= "state" type= "xs:string"/>
            <xs:element name= "zipCode" type= "xs:string"/>
            <xs:element name= "GPS" type= "xs:string"/>
          </xs:sequence>
        </xs:complexType>
    </xs:element>
    <xs:group name= "companions">
        <xs:sequence>
            <xs:element name= "userID" type= "xs:string"/>
            <xs:element name= "name" type= "xs:string"/>
            <xs:element name= "rshType" type= "xs:positiveInteger"/>
            <xs:element name= "coefficient" type= "xs:decimal"/>
        </xs:sequence>
    </xs:group>
</xs:element>
</xs:schema>
```

Schema Excerpt for Example Service 166D: Photo Information

```
<xml version= "1.0 encoding= "ISO-8859-1" ?>
<xs:schema xmlns:xs= "http://www.w3org/2001/XMLSchema">
<xs:element name= "image">
    <xs:attribute name= "imageID" type= "xs:string" use= "required" />
    <xs:element name= "photoDate" type= "xs:date"/>
    <xs:element name= "photo Time" type= "xs:time"/>
    <xs:element name= "caption" type= "xs:string"/>
    <xs:element name= "GPSLocation" type= "xs:string"/>
    <xs:element name= "numLikes" type= "xs:positiveInteger"/>
    <xs:group name= "taggedPerson">
        <xs:sequence>
            <xs:element name="userID" type= "xs:string"/>
            <xs:element name= "name" type= "xs:string">
            <xs:element name= "rshType" type= "xs:positiveInteger"/>
            <xs:element name= "coefficient" type= "xs:decimal">
            <xs:element name= "commonGroup" type= "xs:positiveInteger" minOccurs=0 maxOccurs= "unbounded"/>
        </xs:sequence>
    </xs:group>
    <xs:group name= "comment">
        <xs:sequence>
            <xs:element name= "userID" type= "xs:string"/>
            <xs:element name= "threadID" type= "xs:string"/>
            <xs:element name= "text type"= "xs:string"/>
            <xs:element name= "postingDate type"= "xs:date"/>
            <xs:element name= "postingTime" type= "xs:time"/>
            <xs:element name= "numLikes" type= "xs:positiveInteger"/>
        </xs:sequence>
    </xs:group>
</xs:element>
</xs:schema>
```

In step 220, the code generator may generate a set of platform classes and corresponding platform interfaces for each service, based on its respective schema specification. These platform classes and interfaces may be accessible across the entire platform, for use by any application running within the context of the platform (e.g., an application class may implement a platform interface corresponding to a platform class). Metadata may be retained to indicate which service schema served as the basis for generating a particular platform class, interface, or element thereof (e.g., a property or method). Such metadata may be stored in a data store maintained by query engine 164. Alternatively, the metadata may be built into each platform class or interface as it is generated (e.g., as an additional property).

In particular embodiments, a particular platform class or interface may include elements generated based on two or more service schemas. In some embodiments, a particular platform class, interface, or element may represent a single piece of data stored in two or more services—in such cases, additional metadata may be retained to indicate which service should be accessed (e.g., in the form of a simple designation or as the calculated result of an analysis based upon one or more factors). Each platform class may represent a data type or data structure as described in the schema specification, and all such data types may be represented in a single platform-wide type hierarchy.

Listed below are example platform classes and interfaces generated based on the schemas described above:

User Profile Information

```
interface userProfileInterface {
    String getUserID( );
    Date getMemberSince( );
    String getName( );
    String getEmailAddress( ) ;
    String getCellPhoneNumber( );
    int getAge( );
    String getGender ( ) ;
    Location getResidence( );
    interface Location {
        String getConceptID( );
        String getName( );
        String getAddressLine1( );
        String getAddressLine2( );
        String getCity( );
        String getState( ) ;
        String getZipCode( );
        String getGPS( );
    }
}
class userProfile implements userProfileInterface {
    String userID;
    Date memberSince;
    String name;
    String emailAddress;
    String cellPhoneNumber;
    int age;
    String gender;
    Location residence;
    String getUserID( ) { return userID; }
    Date getMemberSince( ) {return memberSince; }
    String getName( ) { return name; }
    String getEmailAddress( ) { return emailAddress; }
    String getCellPhoneNumber( ) { return cellPhoneNumber; }
    int getAge( ) { return age; }
    String getGender( ) { return gender; }
    Location getResidence( ) { return residence; }
    class LocationImpl implements Location {
        String conceptId;
        String name;
        String address1 ;
        String address2;
        String city;
        String state;
        String getConceptID( ) { return coneceptID;}
        String getName( ) { return name;}
        String getAddressLine1 ( ) { return address1;}
        String getAddressLine2 ( ) { return address2;}
        String getCity( ) { return city;}
        String getState( ) { return state; }
        String getZipCode( );
        String getGPS( );
    }
}
```

Relationship Information

```
interface relationshipsInterface {
    String getUserID( );
    Relationship*getFriends( );
    interface Relationship {
        User getFriend( );
        Date getConnectedSince( );
        int getRshType( );
        Boolean getFollowing( );
        float getCommunicationFrequency( );
        float getAffinityCoefficient( );
        int getCommonGroup( );
    }
}
class RelationshipList implements relationshipsInterface {
    String userID;
    Relationship friends[ ] ;
    String getUserID( ) { return userID; }
    Relationship*getFriends( ) { return friends; }
    class Relationship {
        User friend;
        Date connectedSince;
        int rshType;
        Boolean following;
        float communicationFrequency;
        float affinityCoefficient;
        int common Group; User getFriend( ) { return friend; }
        Date getConnectedSince( ) return connectedSince; }
        int getRshType( ) return rshType;
        Boolean getFollowing( ) { return following; }
        float getCommunicationFrequency( ){ return communicationFrequency; }
        float getAffinityCoefficient( ){ return affinityCoefficient; }
        int getCommonGroup( ){ return common Group; }
    }
}
```

Check-in Information

```
interface CheckinAction {
    String getUserID( );
    Date getCheckInDate( );
    long getCheckInTime( );
    String getMessage( );
    String getEventID( );
    String getPhoto( );
    Int getNumLikes( );
    Location getLocation( );
    interface Location {
        String getConceptID( );
        String getName( );
        String getAddressLine1( );
        String getAddressLine2( );
        String getCity( );
        String getState( );
        String getZipCode( );
        String getGPS( );
    }
}
Class CheckinActionImpl implements CheckinAction {
    String userId;
    Date checkinDate;
```

```
        Long checkinTime;
        String message;
        String eventId;
        String photo;
        Int numLikes;
        LocationImpl location;
        String getUserID( ) { return userId; }
        Date getCheckInDate( ) { return checkinDate; }
        long getCheckInTime( ) { return checkinTime; }
        String getMessage( ) { return message; }
        String getEventID( ) { return eventId; }
        String getPhoto( ) { return photo; }
        Int getNumLikes( ) { return numLikes; }
        Location getLocation( ) { return location; }
        class LocationImpl implements Location {
            String conceptId;
            String name;
            String address1;
            String address2;
            String city;
            String state;
            String getConceptID( ) { return coneceptId;}
            String getName( ) {return name;}
            String getAddressLine1( ) { return address1;}
            String getAddressLine2( ) { return address2;}
            String getCity( ) { return city;}
            String getState( ) { return state; }
            String getZipCode( );
            String getGPS( );
        }
    }
```

Photo Information

```
        Interface Image {
        @Required (true)
        String getImageID( ) ;
        Date getPhotoDate( );
        Long getPhotoTime( );
        String getCaption( );
        String getGPSLocation( );
        Int getNumLikes( );
        }
        class ImageImpl implements Image {
        String imageId;
        Date photoDate;
        Long photoTime;
        String caption;
        String gpsLocation;
        Int numLikes;
        String getimageId( ) { return imageId; }
        Date getPhotoDate( ) { return photoDate; }
        Long getPhotoTime( ) { return photoTime; }
        String getCaption( ) { return caption; }
        String getGpsLocation( ) {return gpsLocation; }
        Int getNumLikes( ) {return numLikes; }
        }
```

By exploring the platform-wide type hierarchy at runtime, the query engine may discover the data type of a particular property provided by the platform interface implemented by an application class.

In step 230, particular embodiments may register adapters to bind data retrieved from the service(s). The adapters may be application-specific or accessible platform-wide. In particular embodiments, an adapter may bind data from a service-specific response to the application class for only particular properties of interest. In particular embodiments, an adapter may bind data from multiple service-specific responses to a single instance of an application class.

In step 240, particular embodiments receive a request to populate properties of the application class with data. As described above, such a request may take the form of instantiating the class, initializing the class instance, retrieving data for one or more properties of the class, or updating one or more properties of the class. The application class may implement a platform interface corresponding to a platform class (or an interface that extends two or more platform interfaces, each corresponding to a platform class). Each property of the application class may be of a data type corresponding to a property of the platform class, and thereby corresponding to a member function provided by the platform interface.

In one example, once a platform class and its accompanying interface have been generated and any necessary adapter(s) provided, an application developer may write an application class that implements a platform interface. For example, given a gaming application, an application class Gamer may implement platform interface UserProfileInterface corresponding to a platform class UserProfile—such an application class may implement only particular properties of interest. For example, application class Gamer may implement the name, age, and gender properties of interface UserProfileInterface. Alternatively, the Gamer class may implement an interface GamerInterface that extends both platform interface UserProfileInterface and platform interface RelationshipInterface. This technique ensures query correctness since the application class is compatible with the platform interface (as enforced by the compiler for the programming language) that was generated based on the schema specification for the service.

In step 250, the query engine "translates" the service-agnostic request by using reflection (i.e., type introspection) to inspect an application class and identify interface(s) implemented by the application class. By identifying the interface(s), the query engine can then traverse the type hierarchy to discover the corresponding platform class(es), look at the associated metadata, and thereby determine which query service(s) to access.

In step 260, the query engine then generates a service-specific query for each identified query service and issues each service-specific query to the appropriate service. Such service-specific queries may take any form, such as, for example: a MYSQL query, an APACHE THRIFT call, a GRAPHQL query, or an APACHE HIVE query.

In step 270, the query engine retrieves response data from the queried service(s).

In step 280, upon receiving a response from the service(s), the query engine then "translates" the service-provided response into a service-agnostic response: an adapter is used to bind data from the service-specific response(s) to the application class by using reflection. Since the adapter operates by using reflection, type safety and correctness are ensured during this translation. For example:

```
class GraphQLAdapter {
    T bind(String data, Class<T> cls) {
        T instance = cls.getConstructor( ).newInstance( );
        JsonNode json = decodeJson(data);
        For (Field clsField : cls.getFields( )) {
            For (KeyValue keyVal : json.entries( )) {
                If (clsField.getName( ).equals(keyVal.getKey( ))) {
                    Class< ? > fieldType = clsField.getType( );
                    Try {
                        Object value = fieldType.cast(keyVal.getValue( ));
                        clsField.set(instance,value);
                    } catch (RuntimeException) {
                        // types don't match, log or fail entire binding
                    }
                }
            }
        }
    }
}
```

```
    // instance is populated with data
    return instance;
  }
 }
}
```

In step 290, the application class is then returned to the client in response to the original client query. This technique thereby ensures type safety, since the returned response meets the exact properties of the type interface requested.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
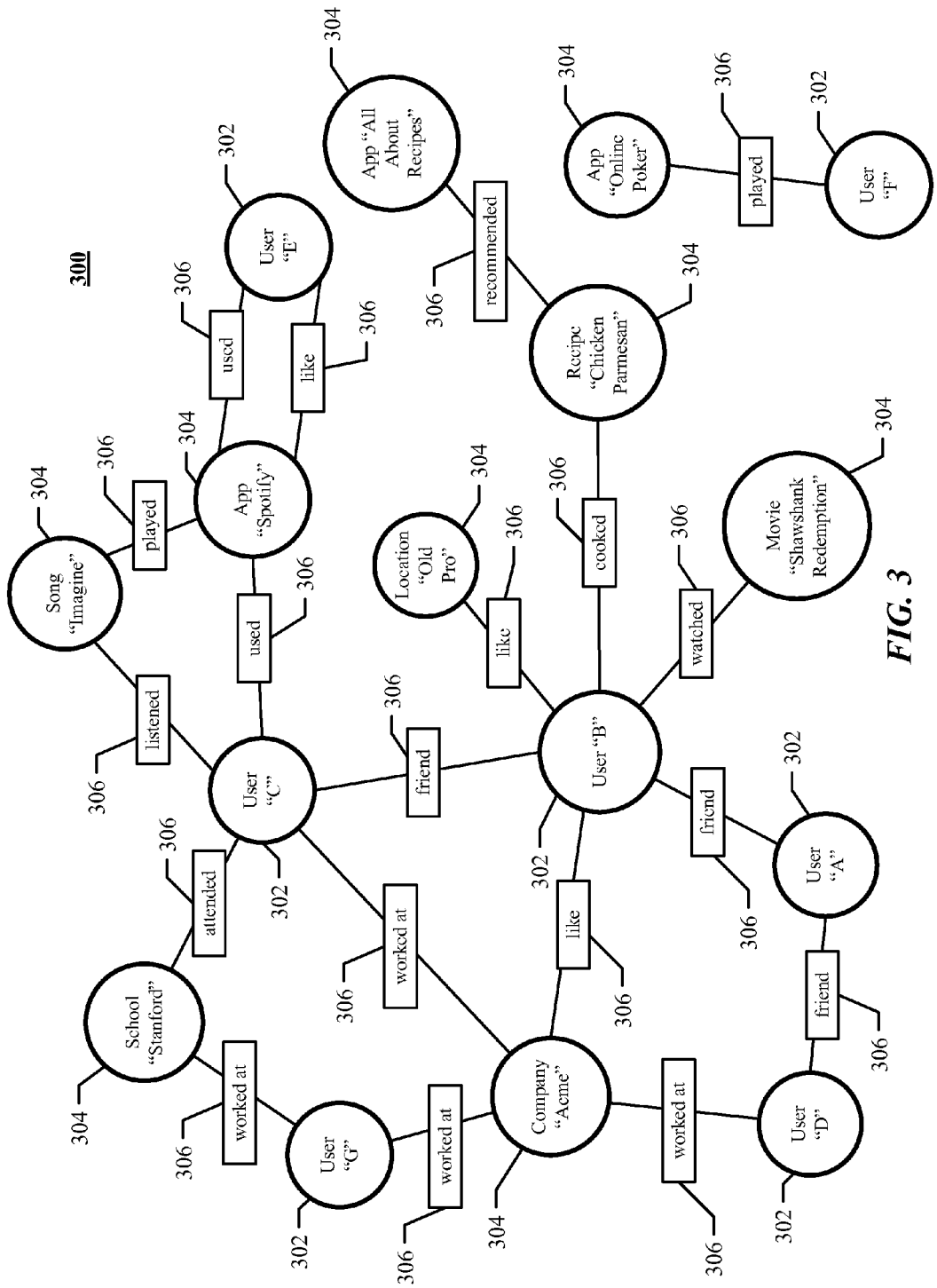
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge)

between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores 168. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to send to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

Figure 4:
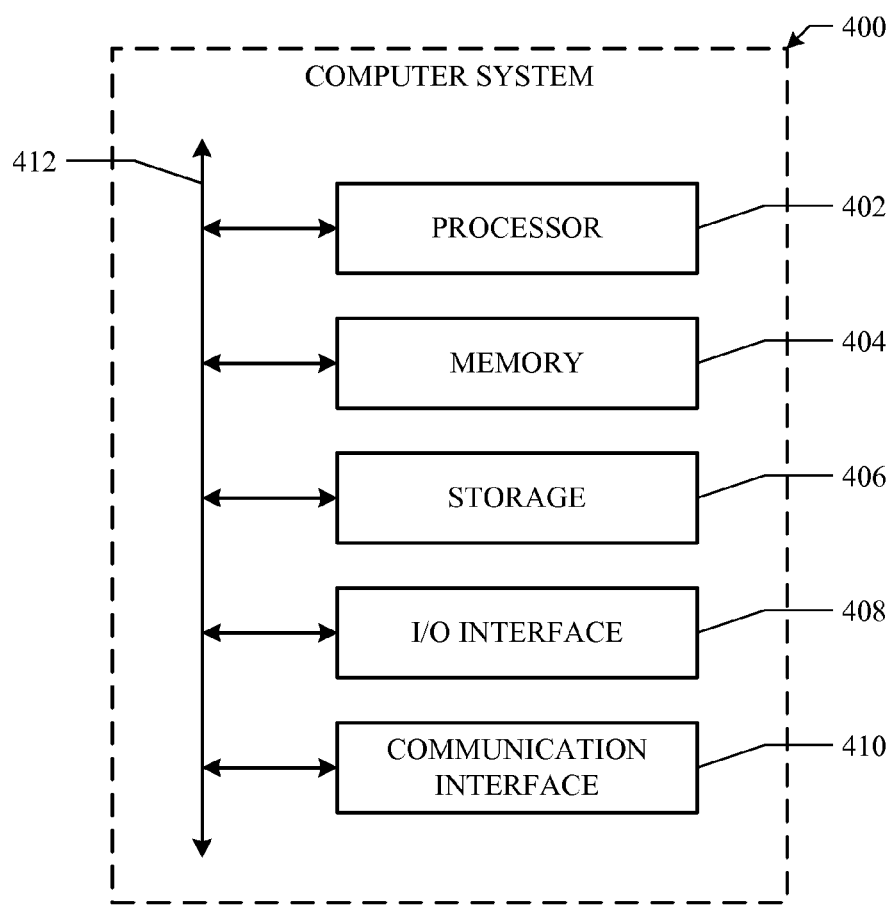
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving a service-agnostic request to populate at least one property of an instance of a service-agnostic application class with data, wherein the property is associated with a data type;
   by the computing device, identifying, by inspecting the service-agnostic application class using reflection, at least one service-specific interface that is implemented by the service-agnostic application class,
   wherein the service-specific interface corresponds to a service-specific class, wherein the service-specific interface and the service-specific class are generated based on a service-specific schema associated with a query service, wherein the query service is configured to respond to data queries;
   by the computing device, identifying the service-specific class that corresponds to the identified service-specific interface;
   by the computing device, identifying the query service based on metadata associated with the identified service-specific class, wherein the metadata indicates that the service schema was used to generate the service-specific class;
   by the computing device, generating a service-specific query for the query service;

by the computing device, retrieving, using the service-specific query, data from the query service;
by the computing device, binding, using reflection, the retrieved data to the at least one property of the instance of the service-agnostic application class, wherein the binding comprises:
identifying an entry in the retrieved data, the entry corresponding to a name of the property, and
setting a value of the property of the instance of the service-agnostic application class to a value associated with the entry; and
by the computing device, returning the instance of the service-agnostic application class in response to the request after the step of binding.

2. The method of claim 1, further comprising:
analyzing, for each of a plurality of query services, a service-specific schema identifying data types provided by the respective query service;
generating, for each of the services and based on the service-specific schemas, service-specific classes, wherein the service-specific classes provide representations of the data types, and wherein the data types represented by the service-specific classes of the plurality of services are represented in the type hierarchy; and
generating service-specific interfaces corresponding to the service-specific classes, wherein the service-specific interfaces provide methods to access properties of the service-specific classes.

3. The method of claim 1, wherein the step of binding comprises:
using an adapter to bind the retrieved data to the at least one property of the service-agnostic application class.

4. The method of claim 1, further comprising:
identifying, using reflection, a second service-specific interface that is implemented by the service-agnostic application class, wherein the second service-specific interface is associated with a second service-specific schema for a second query service;
generating a second query for the second query service associated with the identified second service-specific interface;
retrieving, using the second query, second data from the second query service; and
binding, using reflection, the retrieved second data to the at least one property of the service-agnostic application class.

5. The method of claim 4, wherein the step of binding the retrieved second data comprises:
using an adapter to bind the second data to the at least one property of the service-agnostic application class.

6. The method of claim 1, wherein the request is received from an application executing in conjunction with a social-networking system, and wherein the data retrieved from the query service comprises social graph information stored by the social-networking system.

7. One or more computer-readable non-transitory storage media embodying software that is operable when executed to:
receive a service-agnostic request to populate at least one property of an instance of a service-agnostic application class with data, wherein the property is associated with a data type;
identify, by inspecting the service-agnostic application class using reflection, at least one service-specific interface that is implemented by the service-agnostic application class,
wherein the service-specific interface corresponds to a service-specific class, wherein the service-specific interface and the service-specific class are generated based on a service-specific schema associated with a query service, wherein the query service is configured to respond to data queries;
identify the service-specific class that corresponds to the identified service-specific interface;
identify the query service based on metadata associated with the identified service-specific class, wherein the metadata indicates that the service-specific schema was used to generate the service-specific class;
generate a service-specific query for the query service;
retrieve, using the service-specific query, data from the query service;
bind, by using reflection, the retrieved data to the at least one property of the instance of the application class, wherein the binding comprises:
identifying an entry in the retrieved data, the entry corresponding to a name of the property, and
setting a value of the property of the instance of the service-agnostic application class to a value associated with the entry; and
return the instance of the service-agnostic application class in response to the request after the step of binding.

8. The media of claim 7, wherein the software is further operable when executed to:
analyze, for each of a plurality of query services, a service-specific schema identifying data types provided by the respective query service;
generate, for each of the services and based on the service-specific schemas, service-specific classes, wherein the service-specific classes provide representations of the data types, and wherein the data types represented by the service-specific classes of the plurality of services are represented in the type hierarchy; and
generate service-specific interfaces corresponding to the service-specific classes, wherein the service-specific interfaces provide methods to access properties of the service-specific classes.

9. The media of claim 7, wherein the software operable when executed to bind the retrieved data is further operable to:
use an adapter to bind the retrieved data to the at least one property of the application class.

10. The media of claim 7, wherein the software is further operable when executed to:
identify, using reflection, a second service-specific interface that is implemented by the application class, wherein the second service-specific interface is associated with a second-specific schema for a second query service;
generate a second query for the second query service associated with the identified second service-specific interface;
retrieve, using the second query, second data from the second query service; and
bind, using reflection, the retrieved second data to the at least one property of the application class.

11. The media of claim 10, wherein the software operable when executed to bind the retrieved second data comprises software operable when executed to:
use an adapter to bind the second data to the at least one property of the application class.

12. A system comprising:
one or more processors; and
a memory coupled to the processors comprising instructions executable by the processors, the processors being operable when executing the instructions to:
receive a service-agnostic request to populate at least one property of an instance of a service-agnostic application class with data, wherein the property is associated with a data type;
identify, by inspecting the service-agnostic application class using reflection, at least one service-specific interface that is implemented by the service-agnostic application class,
wherein the service-specific interface corresponds to a service-specific class, wherein the service-specific interface and the service-specific class are generated based on a service-specific schema, wherein the-specific schema is associated with a query service, wherein the query service is configured to respond to data queries;
identify the service-specific class that corresponds to the identified service-specific interface;
identify the query service based on metadata associated with the identified service-specific class, wherein the metadata indicates that the service-specific schema was used to generate the service-specific class;
generate a service-specific query for the query service;
retrieve, using the service-specific query, data from the query service;
bind, by using reflection, the retrieved data to the at least one property of the instance of the service-agnostic application class, wherein the binding comprises:
identifying an entry in the retrieved data, the entry corresponding to a name of the property, and
setting a value of the property of the instance of the service-agnostic application class to a value associated with the entry; and
return the instance of the application class in response to the request after the step of binding.

13. The system of claim 12, wherein the processors are further operable when executing the instructions to:
analyze, for each of a plurality of services, a service-specific schema identifying data types provided by the respective service;
generate, for each of the services and based on the service-specific schemas, service-specific classes, wherein the service-specific classes provide representations of the data types, and wherein the data types represented by the service-specific classes across all of the services are represented in a single type hierarchy; and
generate service-specific interfaces corresponding to the service-specific classes, wherein the service-specific interfaces provide methods to access properties of the service-specific classes.

14. The system of claim 12, wherein the processors operable when executing the instructions to bind the retrieved data are further operable when executing the instructions to:
use an adapter to bind the retrieved data to the at least one property of the application class.

15. The system of claim 12, wherein the processors are further operable when executing the instructions to:
identify, using reflection, a second service-specific interface that is implemented by the application class, wherein the second service-specific interface is associated with a second service-specific schema for a second query service;
generate a second query for the second query service associated with the identified second service-specific interface;
retrieve, using the second query, second data from the second query service; and
bind, using reflection, the retrieved second data to the at least one property of the application class.

16. The system of claim 15, wherein the processors operable when executing the instructions to bind the retrieved second data are further operable when executing the instructions to:
use an adapter to bind the second data to the at least one property of the application class.

17. The system of claim 12, wherein the request is received from a third-party application executing in conjunction with a social-networking system, and wherein the data retrieved from the query service comprises social graph information stored by the social-networking system.

* * * * *